(12) United States Patent
Johnson

(10) Patent No.: US 7,487,463 B2
(45) Date of Patent: Feb. 3, 2009

(54) MULTIPROCESS INPUT REDIRECTION IN A 3D WINDOW SYSTEM

(75) Inventor: Deron D. Johnson, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 726 days.

(21) Appl. No.: 11/054,488

(22) Filed: Feb. 9, 2005

(65) Prior Publication Data

US 2005/0179703 A1 Aug. 18, 2005

Related U.S. Application Data

(60) Provisional application No. 60/545,246, filed on Feb. 17, 2004.

(51) Int. Cl.
G06F 3/048 (2006.01)
G06F 3/00 (2006.01)
G06T 15/00 (2006.01)
G09G 5/00 (2006.01)

(52) U.S. Cl. .............. 715/781; 715/733; 345/419; 345/619; 709/203

(58) Field of Classification Search .............. 715/733, 715/781; 709/203; 345/632, 419, 619
See application file for complete search history.

(56) References Cited

U.S. PATENT DOCUMENTS

| | | | |
|---|---|---|---|
| 5,293,529 A * | 3/1994 | Yoshimura et al. | 345/158 |
| 5,880,733 A * | 3/1999 | Horvitz et al. | 715/850 |
| 6,597,358 B2 * | 7/2003 | Miller | 345/427 |
| 2003/0120823 A1 * | 6/2003 | Kim et al. | 709/310 |
| 2003/0160776 A1 * | 8/2003 | Sowizral et al. | 345/418 |
| 2004/0090467 A1 | 5/2004 | Bonura et al. | |
| 2005/0057497 A1 | 3/2005 | Kawahara et al. | |
| 2005/0060661 A1 | 3/2005 | Kawahara et al. | |
| 2005/0182844 A1 | 8/2005 | Johnson et al. | |
| 2005/0204306 A1 | 9/2005 | Kawahara et al. | |

OTHER PUBLICATIONS

Niklas Elmqvist, "3Dwm: A Platform for Research and Development of Three-Dimensional User Interfaces," Goteborg, 2003, Department of Computing Science, Technical Report No. 2003-04, 22 pages.
U.S. Appl. No. 11/054,154, filed Feb. 9, 2005.
U.S. Appl. No. 11/054,297, filed Feb. 9, 2005.
Maarten Van Dantzich, George Robertson and Vadim Gorokhovsky; "Application Redirection: Hosting Windows Applications in 3D"; ACM Workshop on New Paradigms in Information Visualization and Manipulation; 1999; pp. 87-91; Kansas City, MO, U.S.A.

* cited by examiner

*Primary Examiner*—Ting Zhou
(74) *Attorney, Agent, or Firm*—Robert C Kowert; Meyertons, Hood, Kivlin, Kowert & Goetzel, P.C.

(57) ABSTRACT

A 3D window system allows the contents of conventional windows created by client applications to be painted onto the surfaces of 3D objects which are then displayed in a 3D environment. The 3D window system includes a window system server and a display server. The window system server and the display server access a shared visibility structure which contains information representative of a collection of 3D objects. The window system server determines which 3D object is selected by an input event, determines a window corresponding to the 3D object, and delivers event messages to client applications which have expressed an interest in receiving events relative to the window.

25 Claims, 6 Drawing Sheets

MULTIPROCESS INPUT REDIRECTION IN A 3D WINDOW SYSTEM

PRIORITY CLAIM

This application claims the benefit of priority to U.S. Provisional Application No. 60/545,246, filed on Feb. 17, 2004, entitled "Multiprocess Input Redirection in a 3D Window System", invented by Deron D. Johnson, which is hereby incorporated by reference in its entirety.

BACKGROUND OF THE INVENTION

1. Field of the Invention

This invention is related to the field of 3D user interfaces, and more particularly, to a system and method for performing input redirection in a 3D window system.

2. Description of the Related Art

A 3D window system may be configured to manage a 3D user interface for a set of conventional client applications. A conventional client application is an application which is configured to create windows only through a conventional 2D window system API (such as the API of the X11 window system or the API of Microsoft Windows) and to modify these windows only through a conventional 2D graphics API and/or a 3D graphics API (such as OpenGL or Direct3D). The 3D window system allows the image contents of conventional windows created by conventional client applications to be painted onto the surfaces of 3D objects which are then displayed in a 3D environment. In order for the user to be able to control a conventional application, it may be necessary for a conventional client application to be informed when an input event (e.g., a mouse event) occurs and the cursor is over a 3D object corresponding to a conventional window.

SUMMARY

In one set of embodiments, a 3D window system may be configured to operate as follows. A display server, executing on a host computer updates a shared visibility structure. The shared visibility structure stores data sufficient to support a picking computation on a set of 3D objects that populate a 3D environment. An event manager, executing in a window system server and in a separate process from the display server, reads data from the shared visibility structure to determine a 3D object which is intersected by a picking shape (e.g., a ray) defined by an input event. The orientation (or some other spatial parameter) of the picking shape is defined by the input event. The event manager determines a window which corresponds to the 3D object. Furthermore, the event manager sends a message to one or more interested clients, informing them that a particular event has occurred within the window. The form and content of the message may depend on whether the client is a conventional client or a non-conventional client.

BRIEF DESCRIPTION OF THE DRAWINGS

The following detailed description makes reference to the accompanying drawings, which are now briefly described.

Figure 1:
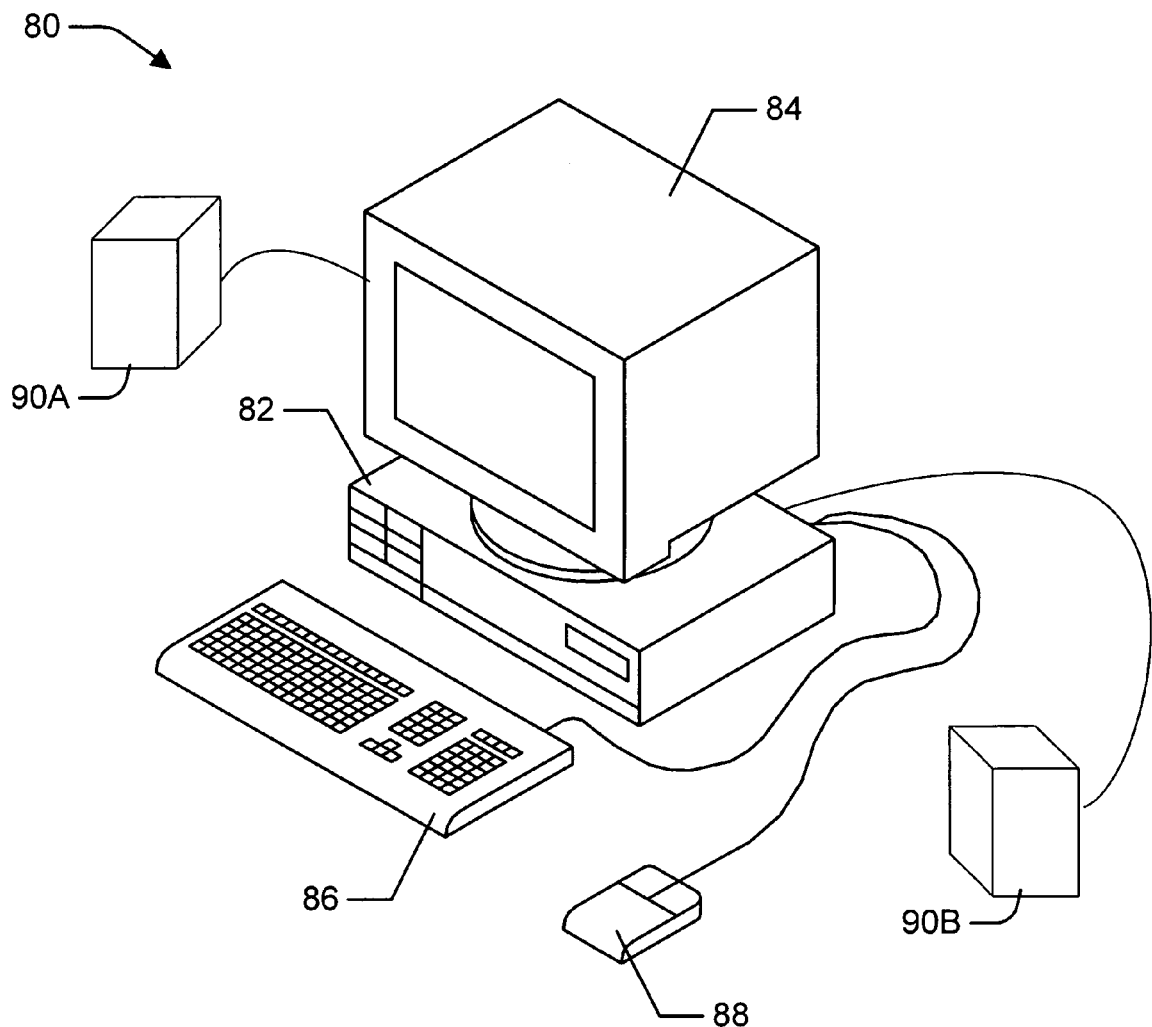
FIG. 1 illustrates one embodiment of a computer 80 which may be used to host execution of a 3D window system and/or client applications.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The following patent applications are hereby incorporated by reference in their entirety:

(1) U.S. Provisional Application No. 60/545,246, filed on Feb. 17, 2004, entitled "Multiprocess Input Redirection in a 3D Window System", invented by Deron D. Johnson;

(2) U.S. Provisional Application No. 60/545,266, filed on Feb. 17, 2004, entitled "Efficient Communication in a Client-Server Scene Graph System", invented by Johnson, Kawahara, Byrne, Rushforth and Twilleager;

(3) U.S. Provisional Application No. 60/545,241, filed on Feb. 17, 2004, entitled "Window System 2D Graphics Redirection Using Direct Texture Rendering", invented by Deron D. Johnson;

(4) U.S. patent application Ser. No. 11/054,154, filed on Feb. 09, 2005, entitled "Efficient Communication in a Client-Server Scene Graph System", invented by Johnson, Kawahara, Byrne, Rushforth and Twilleager; and (5) U.S. patent application Ser. No. 11/054,297, filed on Feb. 09, 2005, entitled "Window System 2D Graphics Redirection Using Direct Texture Rendering", invented by Deron D. Johnson.

A three-dimensional (3D) window system may be configured to manage a 3D user interface for a set of client applications. The client applications include conventional client applications and non-conventional client applications. A conventional client application is an application which is configured to create windows only through a conventional 2D window system API (such as the API of the X11 window system or the API of Microsoft Windows) and to modify these windows only through a conventional 2D graphics API and/or a 3D graphics API (such as OpenGL or Direct3D). Such windows are referred to herein as conventional windows.

Examples of conventional client applications include many popular email clients, web browsers, word processors, spreadsheets, photo viewers/editors, video viewers/editors and database applications.

The 3D window system maps the image contents of the conventional windows as textures onto the surfaces of 3D objects in a 3D environment. Thus, the user may read an email on the surface on one 3D object and watch a video on the surface on another 3D object. Such a 3D object which has a conventional window mapped onto one of its surface is referred to herein as a conventional object.

A non-conventional client application is an application which is configured to create and modify windows having 3D structure. The non-conventional client application is aware that these windows exist in a 3D window system environment. Such windows are referred to herein as non-conventional windows. The non-conventional client application specifies to the 3D window system a 3D object (or set of 3D objects) defining the shape and appearance of a non-conventional window. Such a 3D object corresponding to a non-conventional window is referred to herein as a non-conventional object. As an example, a non-conventional client application may specify the 3D object geometry and texture for a first object representing a physical compact disk (CD) player and the geometry and textures for another set of 3D objects representing music CDs.

The 3D window system responds to user inputs and manipulates various properties of the conventional objects and non-conventional objects such as position, orientation, size and transparency.

The client applications and the 3D window system may execute on the same computer, or alternatively, on different computers coupled through any of a variety of well-known communication mechanisms (e.g., through a computer network).

The computer on which the 3D window system executes may couple to one or more display devices, one or more audio output devices, one or more input devices, and one or more graphics accelerators. Display devices include devices such as monitors, projectors and head-mounted displays. Input devices include devices such as keyboards, mice, joysticks, track balls, game controllers, data gloves, microphones, sensors of physical properties, etc.

FIG. 1 illustrates one embodiment of a computer 80 which may be used to host execution of the 3D window system and/or one or more of the client applications. Computer 80 may include system unit 82, monitor 84, keyboard 86, mouse 88, speakers 90A and 90B, and a graphics accelerator (not shown).

Figure 2:
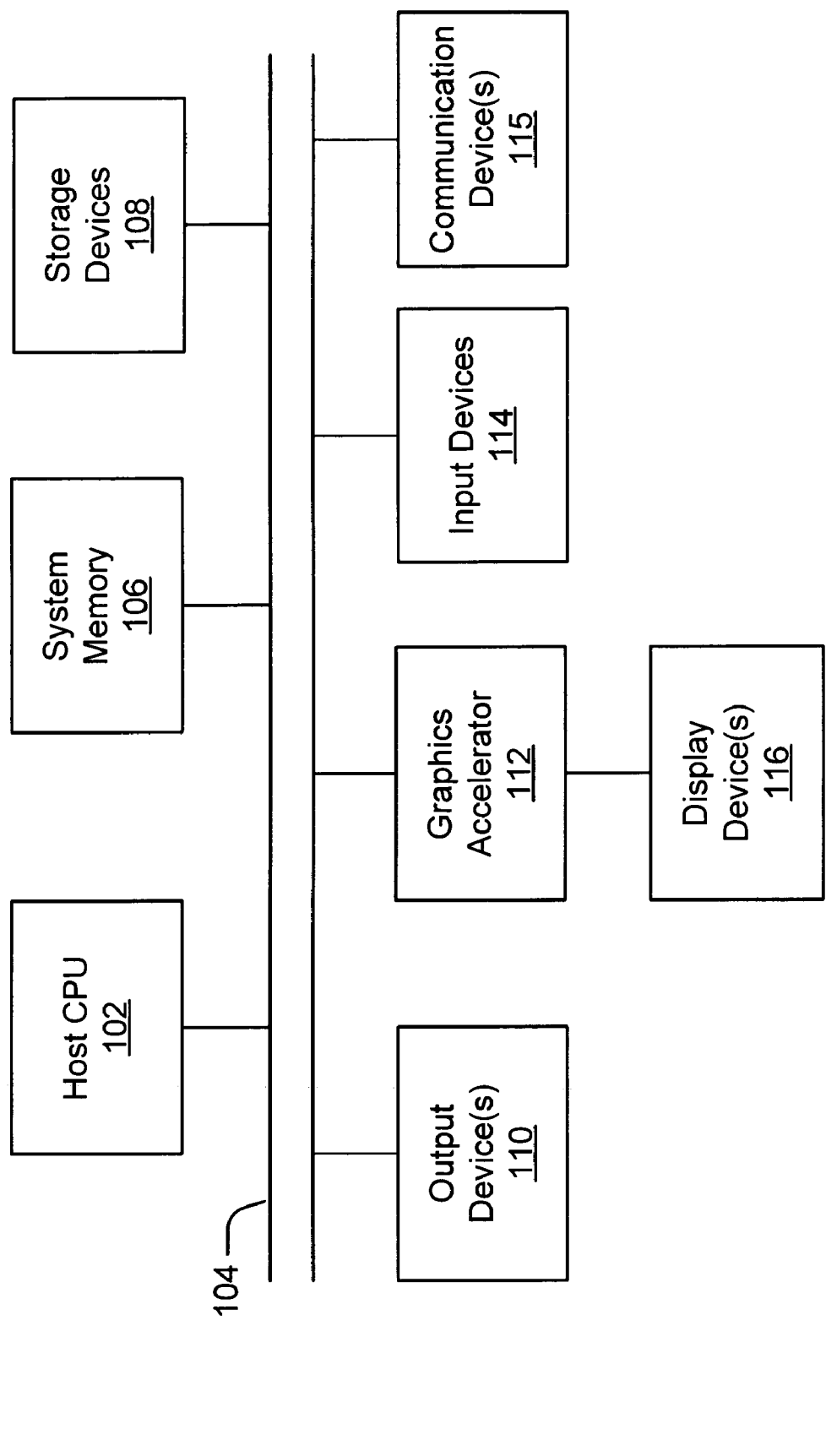
FIG. 2 is a block diagram for one embodiment of a computer 100 that may be used to host execution of the 3D window system and/or client applications.

FIG. 2 is a block diagram for a computer 100 that may be used to host execution of the 3D window system and/or one or more of the client applications. Computer 100 includes one or more central processing units (CPUs) 102, a system memory 106, storage devices 108 (such as CD-ROM drives, hard drives, floppy drives, tape drives), one or more output devices 110 such as speakers, a graphics accelerator 112, one or more input devices 114 (such as a mouse, a keyboard, physical sensors, etc.), one or more communication devices 115 (such as network interfaces, modems, radio transceivers, etc.) and one or more display devices 116. The graphics accelerator 112 drives the display devices 116. These devices and system components may be coupled through a system bus 104.

Figure 3:
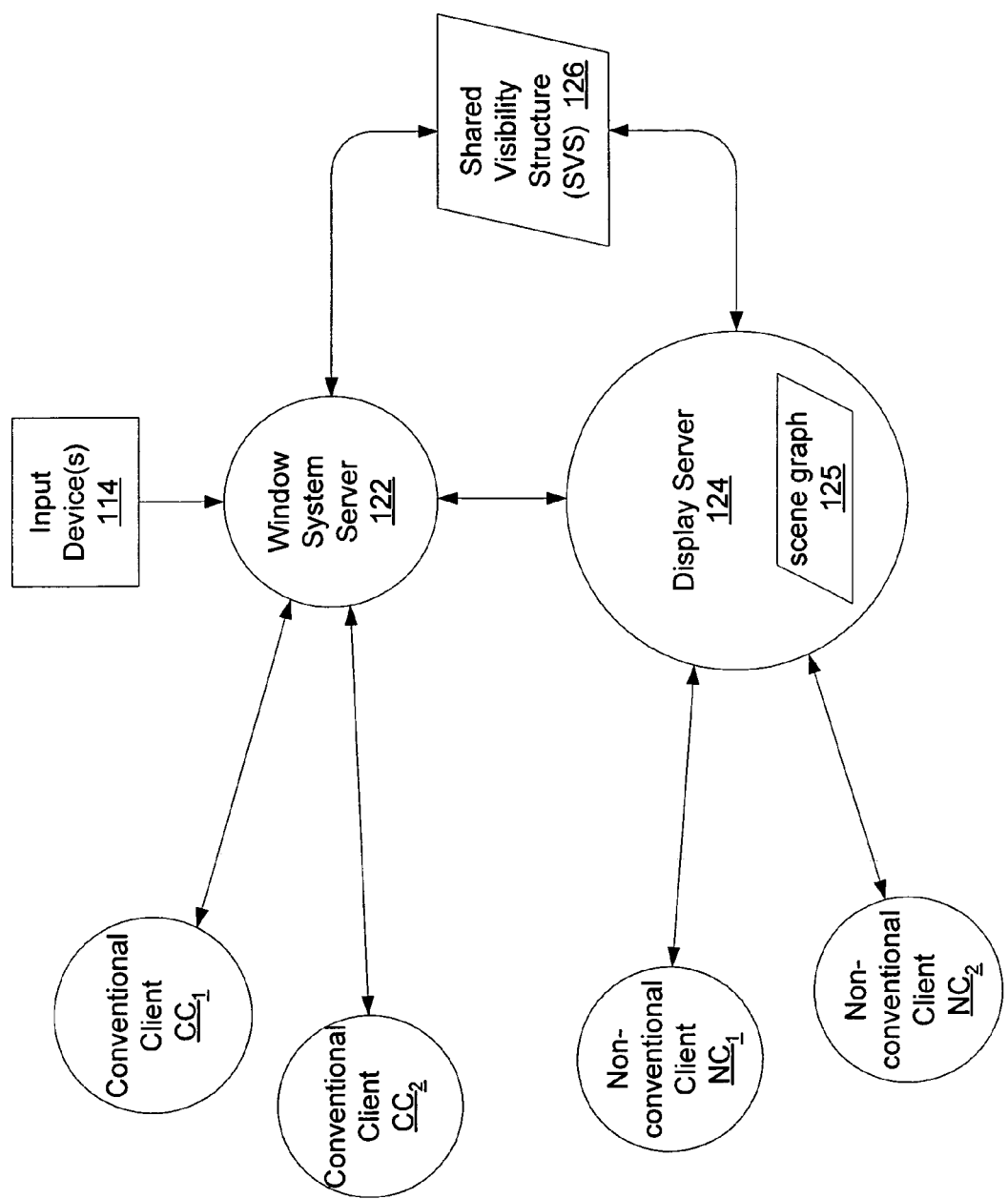
FIG. 3 illustrates a set of client applications interacting with a 3D window system including a window system server and a display server.

The 3D window system may include a window system server 122 and a display server 124 that execute as separate processes in the same operating system environment as suggested by FIG. 3. The window system server 122 may interact with a number of conventional client applications $CC_1$, $CC_2$, ..., $CC_N$. The display server 124 may interact with a number of non-conventional client applications $NC_1$, $NC_2$, ..., $NC_M$. The values N and M are positive integers. The numbers of conventional client applications and non-conventional client applications, two and two respectively, shown in FIG. 3, are not meant to be limiting. The window system server and display server may support arbitrary numbers of conventional client applications and non-conventional client applications, respectively, subject to fundamental limitations such as memory capacity and available processing bandwidth and data transfer bandwidth. The window system server is configured to receive input from the input devices such as input devices 114.

The window system server may be configured so that the interface it presents to conventional client applications is identical to (or, similar to, or, a superset of) the interface presented by a conventional 2D window system (such as the X11 Window System or Microsoft Windows). Thus, any conventional client application configured to operate in the environment of the conventional 2D window system may operate in the environment of the 3D window system.

In some embodiments, the conventional 2D window system whose API is supported by the window system server has an identifiable server process. In other embodiments, the conventional 2D window system whose API is supported by the window system server does not have an identifiable server process. Use of the term "window system server" does not imply that a conventional 2D window system must have an identifiable server process in order for the window system server to provide API support for that conventional 2D window system. Various embodiments of the window system server are contemplated in order to provide support for a wide variety of conventional 2D window system APIs to client applications.

The display server manages a scene graph which contains representations of 3D objects. The 3D objects may include conventional objects and non-conventional objects. Part of the on-going action of the display server is to repeatedly traverse the scene graph to induce rendering of the 3D objects. (Scene graphs and their traversal to induce object rendering are well known concepts to those skilled in the art of computer graphics, and especially to users of Java3D™.) The display server may interface with a 3D foundation graphics library (such as OpenGL or Direct3D) in order to implement the 3D object rendering.

Figure 4:
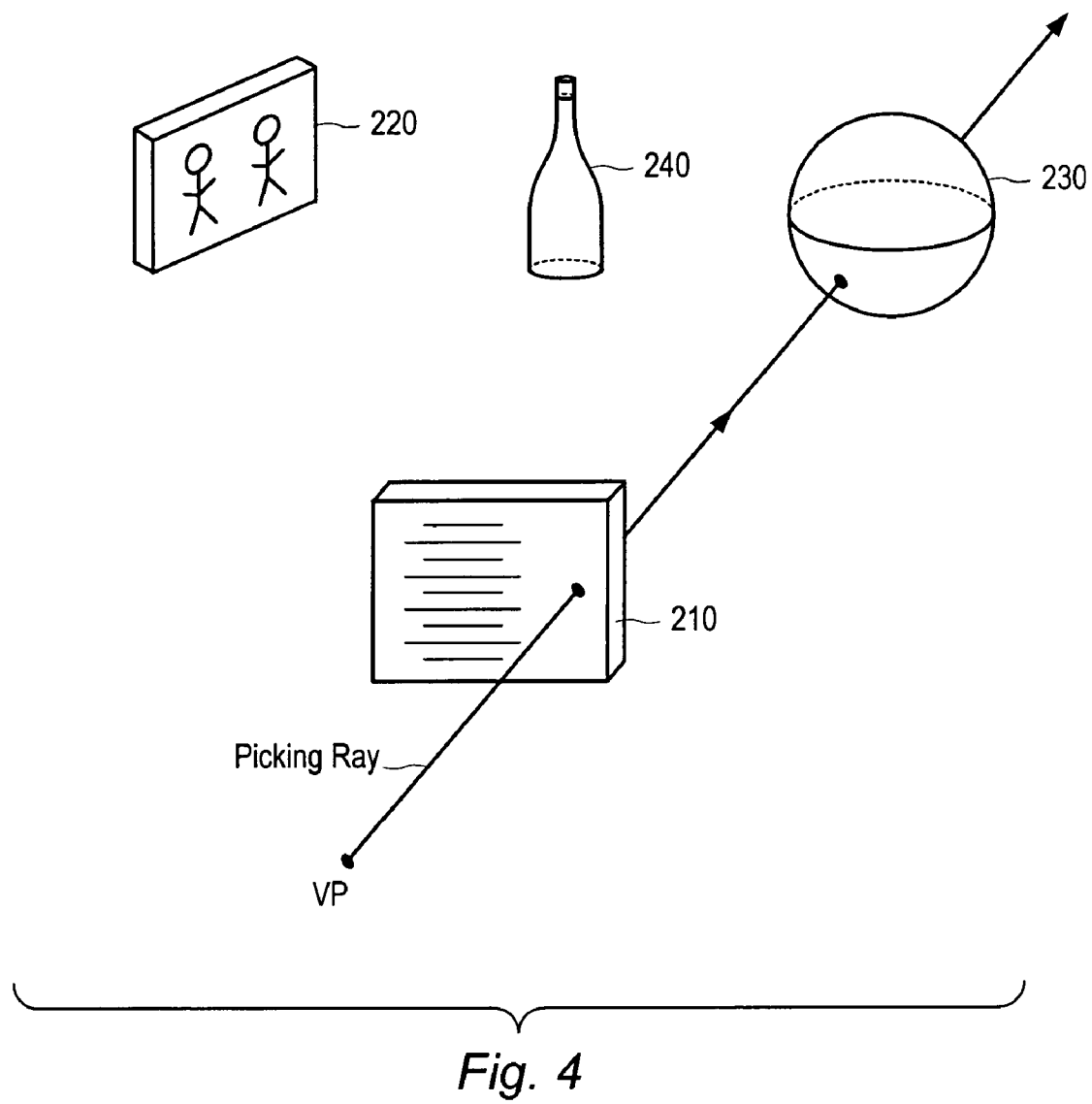
FIG. 4 illustrates a picking computation in a 3D environment containing two conventional objects and two non-conventional objects.

The window system server includes an event manager. The event manager handles input events from the input devices. In particular, the event manager may be configured to perform a picking operation in response to an input event (e.g., a mouse input event or mouse-over event) as suggested by FIG. 4. The screen coordinates of the input event define a ray (or, more generally, identify a direction or spatial orientation for a picking shape) emanating from a current viewpoint (VP) in the 3D environment. The picking operation determines the world coordinates of points of intersection between the picking ray and 3D objects in the 3D environment. For example, the picking ray illustrated in FIG. 4 intersects the conventional object 210 and non-conventional object 230 and misses conventional object 220 and non-conventional object 240.

The event manager may determine the 3D object $Q_{CL}$ that contains the closest intersection point $P_{CL}$ to the viewpoint. The event manager may examine the object $Q_{CL}$ to determine if it corresponds to one of the conventional windows. The event manager may maintain a table that maps conventional window identifiers to 3D object identifiers to facilitate this examination.

If the object $Q_{CL}$ corresponds to a conventional window, the event manager may use the world coordinates or the texture coordinates of the point $P_{CL}$ to compute the coordinates $(X_W, Y_W)$ of the point $P_{CL}$ relative to the coordinate system of the conventional window. The event manager sends a message describing the input event and containing the window coordinates ($X_W, Y_W$) to each conventional client application that has expressed an interest in receiving such event messages with respect to the conventional window.

Each conventional client application may send one or more registration requests to the event manager in order to register an interest in receiving such event messages with respect to one or more conventional windows. For example, a conventional client application is likely to be interested in receiving such event messages at least for the conventional windows that it has created. A conventional client application may also be interested in receiving such event messages for one or more conventional windows created by other conventional client applications or by non-conventional client applications. (Note that the definition of a non-conventional client application given herein does not exclude the possibility that a non-conventional client application may create conventional windows using a conventional 2D window system API.) The event manager maintains a table that maps each conventional window identifier to a list of interested conventional client applications.

If the object $Q_{CL}$ corresponds to a non-conventional window, the event manager may send a message describing the input event and containing the screen coordinates of the input event to the display server. The display server may forward this message to the interested non-conventional client applications. In one embodiment, the message may be an "extended event". The extended event may include a type field which indicates that it is an extended event and also a field which contains the original type of the event (e.g. mouse motion, key press, etc.). The extended event may also include all of the information that a 2D window system would send for that event type. In addition, the extended event may include: the scene graph object ID (SID) of the scene graph node for the object $Q_{CL}$, and the real number coordinates of the 3D intersection point $P_{CL}$, or an approximation thereof (e.g. single-precision floating point coordinates).

Each non-conventional client application may send one or more registration requests to the display server in order to register an interest in receiving event messages with respect to one or more non-conventional windows and/or one or more conventional windows. These registration requests may be forwarded to the event manager. The event manager may maintain a table which maps identifiers of non-conventional client applications to corresponding lists of 3D object identifiers.

The picking operation relies on a visibility structure (denote by item number 126 in FIG. 3) stored in memory that is shared between the window system server process (which includes the event manager) and the display server process. Thus, the visibility structure will be referred to herein as a "shared visibility structure". The shared visibility structure (SVS) may store data representing the 3D objects of the 3D environment and may have any of a variety of forms. The event manager reads data from the shared visibility structure when performing the picking operation. The display server is responsible for creating and updating the shared visibility structure.

The shared visibility structure may store descriptions of containing objects that geometrically bound (i.e., spatially contain) the 3D objects of the 3D environment. The shared visibility structure may also include the 3D geometry for the 3D objects. The containing objects may be members of a predefined class. For example, in one set of embodiments, the containing objects are hulls such as polytope hulls (i.e., hulls having planar faces). In another set of embodiments, the containing objects may be spheres or rectangular parallelepipeds.

It may be desirable for a containing object to minimally bound a given object. A containing object C is said to minimally bound an object when the containing object C spatially contains the object and has a minimal volume in the collection of all containing objects of the predefined class that spatially contain the object.

In one set of embodiments, the shared visibility structure may include a data structure derived from the scene graph. For example, the shared visibility structure may include a hull tree. A hull tree is a tree composed of nodes. A node that does not have any children is said to be a "leaf node". Each leaf node of the hull tree corresponds to a shape node in the scene graph. (A shape node is a node which contains geometry data). Each leaf node of the hull tree specifies a hull that bounds (e.g., minimally bounds) the geometry data of the corresponding shape node.

A non-leaf node of the hull tree specifies a hull which bounds (e.g., minimally bounds) the hulls of its children nodes. Therefore, the root node of the hull tree specifies a hull that bounds (e.g., minimally bounds) all the 3D objects in the 3D environment. All the hulls in the hull tree may be specified with respect to a common coordinate system, e.g., the coordinate system of the root node of the scene graph.

In one set of embodiments, the picking operation may be implemented as a search through the hull tree for intersections between hulls and a picking shape (e.g., a picking ray). Several observations regarding the search process follow from the above definition of the hull tree.

(A) If the picking shape misses (i.e., fails to intersect) the hull of the root node, the picking shape must necessarily miss all the 3D objects represented by the hull tree: the picking operation can immediately report that there are no intersections.

(B) If the picking shape misses the hull of a given non-leaf node K, the picking shape must necessarily miss the hulls of the children nodes of node K, and thus, the children nodes need not be searched.

(C) If the picking shape hits (i.e., intersects) the hull of a given non-leaf node K and misses the hull of a given child node, the search for intersections may skip the given child node and the subgraph represented by that child node and immediately concentrate on the remaining children nodes of the node K.

In one embodiment, the shared visibility structure is a binary hull tree. A binary hull tree is characterized by the property that each non-leaf node points to two children nodes. The two children nodes are referred to herein as the left node and the right node. Various types of hulls and techniques for constructing hull trees are well known in the art of computer graphics.

In another set of embodiments, the shared visibility structure is an exact copy of the scene graph which is owned by the display server. For each node in the scene graph there is a node in the shared visibility structure which has exactly the same attributes as the scene graph node. Furthermore, the connectivity between the nodes in the shared visibility structure is the same as the connectivity between the nodes in the scene graph.

In yet another set of embodiments, the visibility structure is a reduced version of the scene graph. For example, the reduced version may have the same connectivity structure between nodes as the scene graph but omit the non-geometric elements of the scene graph.

The display server may create the shared visibility structure when it creates the scene graph, and update the shared visibility structure when it makes visibility-modifying updates to the scene graph. A visibility-modifying update to the scene graph is an update that has the potential to change any result of the picking operation. For example, visibility-modifying updates to the scene graph may include:

changes to the position, orientation, size, shape or topology of one or more 3D objects in the 3D environment;
additions of 3D objects to the 3D environment; and
removals of 3D objects from the 3D environment.

Making one window larger may occlude a portion of another window. Rotating a window away from "parallel to the viewing plane" may expose a portion of another window. Translating a window may expose a portion of another window. Adding a window may occlude portions of windows behind the added window.

Note that a visibility-modifying update to the scene graph does not necessarily imply a modification of object geometry. For example, in some embodiments, the 3D coordinate data describing the hulls may be stored in world coordinates. Thus, a scene graph modification which modifies the global transform of an object may modify the object's hull without modifying the object's geometry.

In response to a visibility-modifying update to the scene graph, the display server may add data to, remove data from or modify data in the shared visibility structure. For example, in the case where the visibility structure is a hull tree, the display server may add nodes, remove nodes and/or update hull data in nodes of the shared visibility structure. Note that a change to the hull of an object (i.e., a leaf node of the shared visibility structure) may induce hull recalculation for one or more nodes in the path up to the root of the shared visibility structure.

In one set of embodiments, the window system server may be constructed by modifying a conventional window system server such as the server of the X Window System. The conventional window system server may include a function that receives as input the screen coordinates $(X_S,Y_S)$ of an input event and returns the identifier of a conventional window from a set of conventional windows that have been created by the conventional client applications. Let this function be denoted by the label "XYTOWIN". A new function XYTOWIN2 may be constructed by replacing the body of the XYTOWIN function with code that performs the event manager functions described above, i.e., the picking operation based on the screen coordinates $(X_S,Y_S)$, the identification of the object $Q_{CL}$ containing the closest intersection point $P_{CL}$, the determination of the identifier of the conventional window (if any) to which the object $Q_{CL}$ corresponds. The new function XYTOWIN2 may replace the function XYTOWIN in the window system server. The new function XYTOWIN2 may have an identical calling interface as the function XYTOWIN, so that functions that call formerly called XYTOWIN do not have to be modified in order to call XYTOWIN2.

As mentioned above, the shared visibility structure (SVS) may be stored in a shared memory area which both the display server and the event manager can access. In one embodiment, access to the SVS may be arbitrated by using a mutex.

The SVS may contain one leaf node for every shape node in the display server's scene graph. Each leaf node of the SVS stores a scene graph object ID (SID) identifying the object described by the corresponding scene graph node. The display server assigns each object in the scene graph a unique SID.

When the event manager receives an event and performs a pick operation on the SVS for that event, and the pick hits an SVS leaf node, an event message is distributed to each interested client application. In this way, client applications are made aware that this event has "occurred to" the window corresponding to the SVS leaf node. In the SVS there is a mapping from leaf nodes to their corresponding windows.

In the case where the shared visibility structure is a binary hull tree, the following recursive algorithm may be applied. The pick shape referred to may be an infinite ray defined by an origin point and a direction vector. Initially, the "current node" is equal to the root node of the SVS. The result of this recursive algorithm is a "hit list" which contains a list of "hit nodes." A hit node is a leaf node whose hull intersects the pick shape.

Step 1: The current node is examined to see whether it is a leaf node or a non-leaf node.

Case A: if the current node is a leaf node, and the pick shape intersects the hull of the current node, the current node is added to the list of hit nodes. Regardless of the result of the intersection test, no further processing is performed on this node.

Case B: if the current node is a non-leaf node, for each child of the current node that is non-null, this recursive algorithm is reapplied with the current node equal to the child node.

Step 2: When all node visits, determined by applying Step 1, are complete, if the hit list contains no hit nodes, the picking operation has "missed." In this case, the subroutine which implements this algorithm returns to its caller an indication that the picking operation has not hit any scene graph node. If the hit list contains only one hit node, that node is returned from the routine. If the hit list contains more than one hit node, the node which has the boundary which is closest to the pick shape origin is returned from the routine.

The discussion above concentrates mostly on the case where the picking shape is a ray. However, any of a variety of geometric entities may be used for the picking shape. For example, in some embodiments, the picking shape may be a cone, a cylinder, a plane, a line, or a sphere.

The discussion of picking given above has described identifying the object $Q_{CL}$ containing the closest intersection to the viewpoint, identifying a window $W_{CL}$ corresponding to this closest object, and notifying interested clients of the event relative to this window $W_{CL}$. However, in other embodiments, clients may also be interested in being notified of events on windows corresponding to one or more of the non-closest objects intersected by the picking shape.

Figure 5:
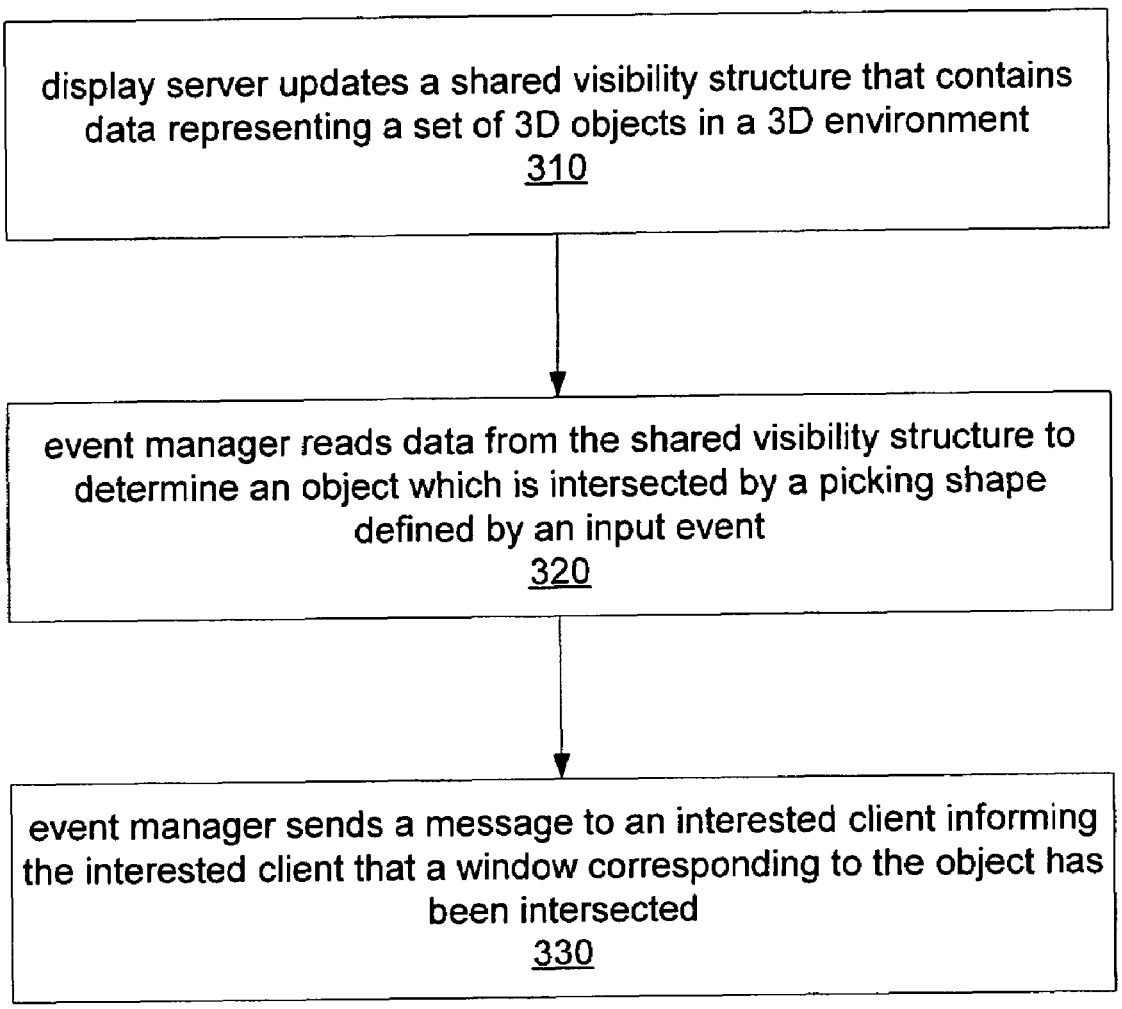
FIG. 5 illustrates one embodiment of a method for operating a 3D window system to arrange for input redirection.

In one set of embodiments, a method for operating a 3D window system may be implemented as suggested in FIG. 5. In step 310, a display server, executing on a host computer, updates a shared visibility structure. The shared visibility structure contains data representing a set of 3D objects in a 3D environment. The shared visibility structure may have any of a wide variety of forms as suggested by the discussion above. The shared visibility structure stores data sufficient to support picking computations (i.e., picking computations as described above, or, as given by any of various software algorithms known in the art of computer graphics).

In step 320, an event manager, executing in a separate process from the display server, reads data from the shared visibility structure to determine an object which is intersected by a picking shape. The orientation (or some other spatial parameter) of the picking shape is defined by an input event.

In step 330, the event manager sends a message to an interested client, informing the interested client that a window corresponding to the object has been selected (e.g., intersected) by the picking shape. The form and content of the message may depend on whether the client is a conventional client or a non-conventional client.

While it is conceivable to have the display server perform the picking operation and to have the window system server invoke the display server picking via an interprocess communication channel, such as remote method invocation (RMI) or a socket, this type of communication would add additional processing overhead to every input event. Thus, the strategy of configuring the display server to maintain a shared visibility structure in shared memory and configuring the window system server to contain its own picking code which accesses the shared visibility structure may execute more efficiently.

It is also conceivable to integrate the functionality of the display server and the event manager into a single process inside the window system server. However, it should be noted that not all window system realizations provide an efficient and portable 3D graphics foundation library API on which the display server graphics components can be built. Thus, the policy of placing the event manger in the window system server and the display server in a separate process from the window system server allows the display server to be more portable between computer systems and involves less performance overhead.

Figure 6:
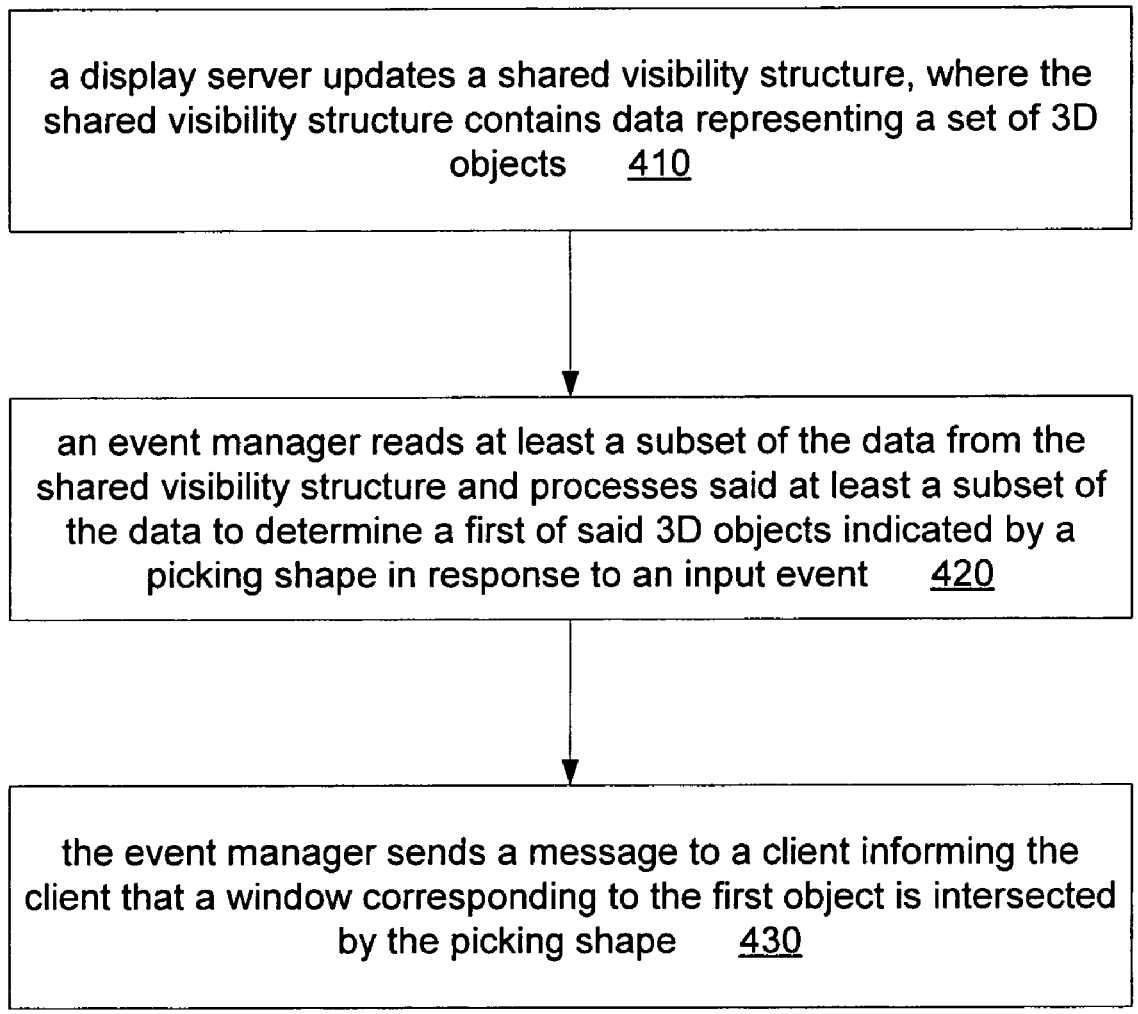
FIG. 6 illustrates one set of embodiments of a method for providing event management service to a set of one or more client applications.

FIG. 6 illustrates one set of embodiments of a method for providing event management services to client applications.

In step 410, a display server (such as display server 124) updates a shared visibility structure. The shared visibility structure contains data representing a set of 3D objects.

In step 420, an event manager reads at least a subset of the data from the shared visibility structure and processes said at least a subset of the data to determine a first of said 3D objects indicated by a picking shape in response to an input event.

In step 430, the event manager sends a message to a client informing the client that a window corresponding to said first object is intersected by the picking shape.

The display server and the event manager may be configured to execute as separate processes on a host computer (such as computer system 100).

In some embodiments, the action of processing said at least a subset of data to determine a first of said 3D objects indicated by the picking shape may include:
    performing a picking operation using said at least a subset of the data from the shared visibility structure to identify one or more of the 3D objects intersected by the picking shape.

The first object is one of said one or more objects intersected by the picking shape. In particular, the first object indicated by the picking shape may be a closest of said one or more objects intersected by the picking shape.

In one embodiment, the display server and the event manager may arbitrate for access to the shared visibility structure using a mutex.

The action of processing said at least a subset of data may produce a point of intersection between said picking shape and said first object. The event manager may determine whether the window is a conventional window or a non-conventional window.

In response to a determination that the window is a conventional window, the event manager may embed coordinate values of the intersection point in the message, where the coordinate values are relative to a coordinate system of the window.

In response to a determination that the window is a non-conventional window, the event manager may embed 3D world coordinates of the intersection point in the message and an identifier of the first object.

In one embodiment, the shared visibility structure may reside in shared memory, i.e., memory of the host computer system that is shared between the display server and the event manager.

In some embodiments, the shared visibility structure resides in a file that is memory mapped into both the event manager and the display server.

The display server may update the shared visibility structure in response to receiving a request to update a scene graph.

The direction or orientation (or more generally, one or more spatial parameters) of the picking shape may be specified by the input event.

The client (to which the message is targeted) may be a client that invoked creation of the window, or, some other client.

In one set of embodiments, the event manager resides within the server process of the X11 window system. The display server may reside outside this server process.

In some embodiments, the shared visibility structure is a hull tree. Each leaf node of the hull tree may specify a hull which spatially bounds a set of geometry for one of the 3D objects. In one embodiment, the hull tree is a binary hull tree.

In one alternative embodiment, the shared visibility structure is an exact copy of a scene graph maintained by the display server.

In yet another alternative embodiment, the shared visibility structure is a reduced version of a scene graph maintained by the display server. This reduced version may exclude non-geometric elements of the scene graph.

The picking shape may be a ray emanating from a current viewpoint. Alternatively, the picking shape may be a 2D cone, a solid cone, a plane, a union of rays, a sphere, etc.

In one set of embodiments, the event manager or the process containing the event manager is single-threaded. The display server may be multi-threaded.

In some embodiments, the event manager may be (or reside in) a stand-alone process.

It is contemplated that any or all of the computational method embodiments described herein may be realized in the form of program instructions stored on computer-readable memory media. Any of various computer-readable memory media are contemplated.

Furthermore, it is contemplated that program instructions realizing any or all of the methods embodiments described herein may be stored in a memory of a computer system. A processor of the computer system may be configured to read the program instructions from the memory and execute the program instructions to implement any or all of the method embodiments described herein.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
   a display server updating a shared visibility structure, wherein the shared visibility structure contains data representing a set of 3D objects;
   an event manager reading at least a subset of the data from the shared visibility structure and processing said at least a subset of the data to determine a first of said 3D objects indicated by a picking shape in response to an input event;
   the event manager sending a message to a client informing said client that a window corresponding to said first object is intersected by the picking shape;
   wherein the display server and the event manager execute in separate processes within an operating system environment such that the process in which the display server executes is distinct from the process in which the event manager executes.

2. The method of claim 1, wherein said processing of said at least a subset of data to determine a first of said 3D objects indicated by the picking shape includes:
   performing a picking operation using said at least a subset of the data from the shared visibility structure to identify one or more of the 3D objects intersected by the picking shape;
   wherein said first object is one of said one or more objects intersected by the picking shape.

3. The method of claim 2, wherein said first object indicated by the picking shape is a closest of one or more of the 3D objects intersected by the picking shape.

4. The method of claim 1 further comprising:
   arbitrating access to the shared visibility structure between the display server and event manager using a mutex.

5. The method of claim 1, wherein said processing produces a point of intersection between said picking shape and said first object, the method further comprising:
   determining whether the window is a conventional window;
   embedding coordinate values of the intersection point in the message in response to a determination that the window is a conventional window, wherein the coordinate values are relative to a coordinate system of the window.

6. The method of claim 1 further comprising:
   determining whether the window is a non-conventional window;
   embedding in the message an identifier of the first object in response to a determination that the window is a conventional window.

7. The method of claim 1, wherein said processing produces a point of intersection between the picking shape and said first object, the method further comprising:
   determining whether the window is a non-conventional window;
   embedding 3D world coordinates of the intersection point in the message in response to a determination that the window is a non-conventional window.

8. The method of claim 1, wherein the shared visibility structure resides in shared memory.

9. The method of claim 1, wherein the shared visibility structure resides in a file that is memory mapped into both the event manager and the display server.

10. The method of claim 1, wherein the display server updates the shared visibility structure in response to receiving a request to update a scene graph.

11. The method of claim 1, wherein an direction of the picking shape is specified by the input event.

12. The method of claim 1, wherein a spatial parameter of the picking shape is specified by the input event.

13. The method of claim 1, wherein the client is a client that invoked creation of the window.

14. The method of claim 1, wherein the client is a client other than the client that invoked creation of the window.

15. The method of claim 1, wherein the window is a conventional window.

16. The method of claim 1, wherein the window is a non-conventional window.

17. The method of claim 1, wherein the event manager resides within the server process of a X11 window system.

18. The method of claim 1, wherein the display server resides outside the server process of a X11 window system.

19. The method of claim 1, wherein the shared visibility structure is a hull tree, wherein each leaf node of the hull tree specifies a hull which spatially bounds a set of geometry for one of the 3D objects.

20. The method of claim 19, wherein the hull tree is a binary hull tree.

21. The method of claim 1, wherein the shared visibility structure is an exact copy of a scene graph maintained by the display server.

22. The method of claim 1, wherein the shared visibility structure is a reduced version of a scene graph maintained by the display server, wherein said reduced version excludes non-geometric elements of the scene graph.

23. The method of claim 1, wherein the picking shape is a ray emanating from a current viewpoint.

24. A computer-accessible storage medium storing program instructions, wherein the program instructions are computer-executable to implement the method recited in claim 1.

25. A system, comprising:
   a processor; and
   a memory comprising program instructions, wherein the program instructions are executable by the processor to implement the method recited in claim 1.

* * * * *